United States Patent

[11] 3,570,780

[72] Inventor Sheldon Lee Pastor
St. Paul, Minn.
[21] Appl. No. 798,749
[22] Filed Feb. 12, 1969
[45] Patented Mar. 16, 1971
[73] Assignee Minnesota Mining and Manufacturing Company
St. Paul, Minn.
Continuation-in-part of application Ser. No. 489,534, Sept. 23, 1965, now abandoned.

[54] MAGNETIC TAPE CARTRIDGE

8 Claims, 10 Drawing Figs.

[52] U.S. Cl. .......... 242/194
[51] Int. Cl. .......... G03b 1/04, G11b 15/32
[50] Field of Search .......... 242/193, 194; 211/4, 11; 179/100.2 (Z)

[56] References Cited

UNITED STATES PATENTS

| | | | |
|---|---|---|---|
| 2,873,073 | 2/1959 | Lekas | 242/193X |
| 2,937,816 | 5/1960 | Wood | 242/193 |
| 3,250,481 | 5/1966 | Seki | 242/194 |
| 3,294,334 | 12/1966 | Boag | 242/194 |

*Primary Examiner*—Leonard D. Christian
*Attorney*—Kinney, Alexander, Sell, Steldt & Delahunt

ABSTRACT: A cartridge enclosing a pair of tape reels independently rotatably mounted on a shaft and guide means in the container guiding the tape from one reel past an opening in one edge of the container and back across the same opening to the other reel.

INVENTOR
SHELDON LEE PASTOR
BY Kinney, Alexander, Sell, Steldt & De La Hunt
ATTORNEYS INVENTOR.
SHELDON LEE PASTOR
BY Kinney, Alexander,
Sell, Steldt & DeLaHunt
ATTORNEYS INVENTOR.
SHELDON LEE PASTOR
BY Kinney, Alexander, Sell, Steldt & De La Hunt
ATTORNEYS INVENTOR.
SHELDON LEE PASTOR
BY Kinney, Alexander, Sell, Steldt & De La Hunt
ATTORNEYS

MAGNETIC TAPE CARTRIDGE

CROSS-REFERENCE TO RELATED APPLICATION

This application is a continuation-in-part of copending application Ser. No. 489,534 filed Sept. 23, 1965 and now abandoned, assigned to the assignee of this application.

This invention relates to a novel tape cartridge wherein the tape is guided from one reel past an opening in the container and back across the same opening to a second reel.

In devices where it is desired to reverse the sense of direction of tape, it is known in the art to utilize a tape path and tape drive whereby the tape passes across one side of a single direction continuously driven capstan, makes a 180° turn, returns across the same side of the capstan but is axially spaced with respect to the capstan from the first path across the capstan, and is driven by pressure rollers positioned on the same side of the capstan as the tape, alternately acting in association with the capstan on one tape path and then when the tape direction is to be reversed, on the other tape path. Such a tape path and tape drive, disclosed in U.S. Pat. No. 3,122,294 issued to F. Laa, is utilized in the present invention which includes a novel cartridge, housing axially aligned tape supply and takeup reels.

In any magnetic tape reproducing or recording device it is desirable to maintain the tape under even tension, regardless of the amount of tape on the supply reel, as it is drawn across the transducer head, and it is also desirable to exert even back-tension, regardless of the amount of tape on the takeup reel, on the tape as it is wound upon the takeup reel. Uneven tension on the tape as it is drawn across the transducer head reduces high fidelity, and uneven tension on the tape as it is wound upon the takeup reel results in a nonuniform winding. Further, in devices where the direction of tape is to be reversed it is desirable to stop the movement or inertia of the tape instantaneously when the tape drive is interrupted.

The present invention provides novel and simple means to place a constant, uniform tension on the tape as it is drawn from the supply reel past a magnetic head and an equal tension in the tape as it is wound onto the takeup reel, which equal tension affords instantaneous stopping of the tape as the tape drive is interrupted. This is accomplished by a single reel driving spindle with independent drive means between the spindle and each reel.

The novel cartridge has the tape positioned along a tape path extending across a cutaway portion on one edge of the cartridge and back across said cutaway portion, and the tape and cartridge may be readily changed in the apparatus without any threading of the tape through the apparatus by the operator.

Further, the novel cartridge is provided with novel brake means for the reels such that when the cartridge is not in an operative position on the apparatus the tape will remain wound on the reels during storage and handling.

The above and further novel features and advantages of the present invention will become more apparent after reading the following detailed description which refers to the accompanying drawings wherein.

Figure 1:
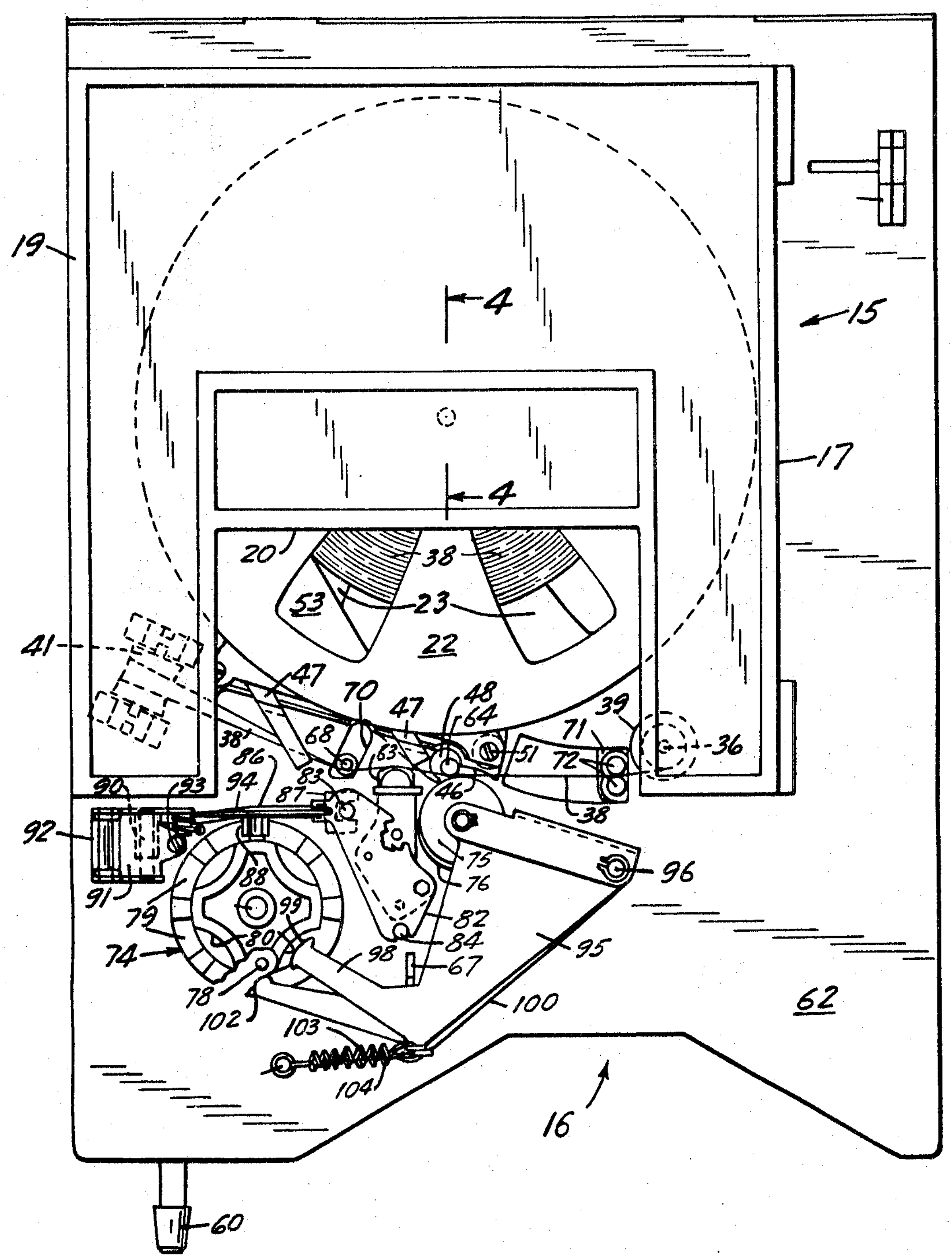
FIG. 1 is a plan view of one embodiment of the cartridge shown in position on a recording and/or reproducing apparatus.
Figure 2:
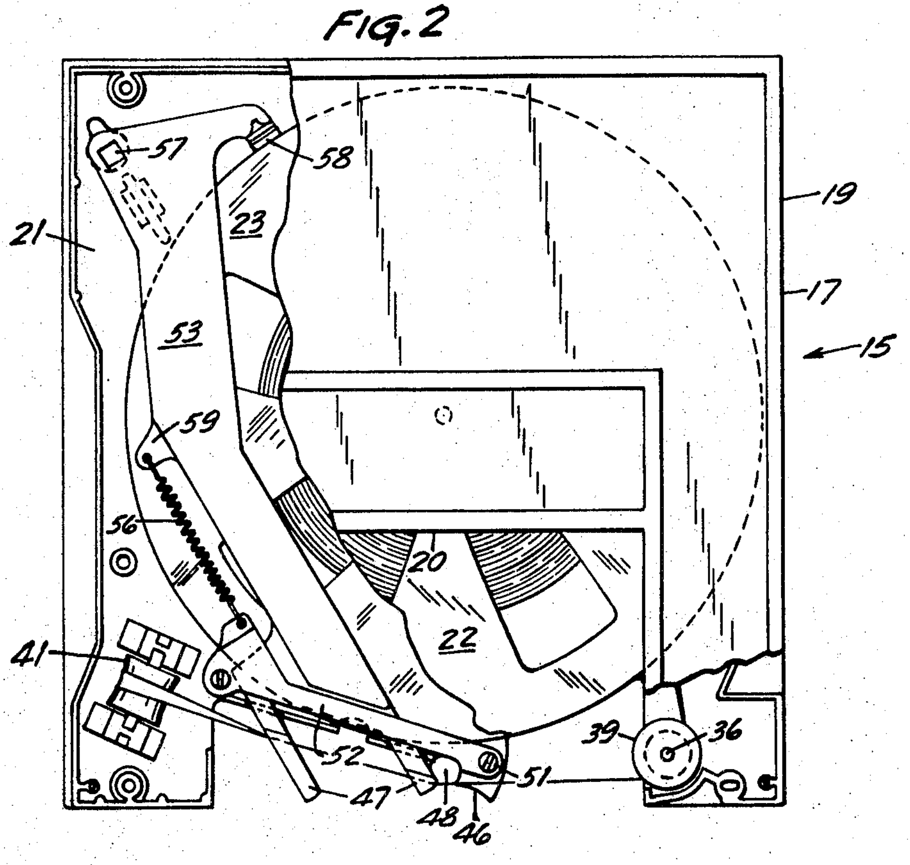
FIG. 2 is a plan view of the cartridge of FIG. 1, partially broken away to show parts located internally.
Figure 3:
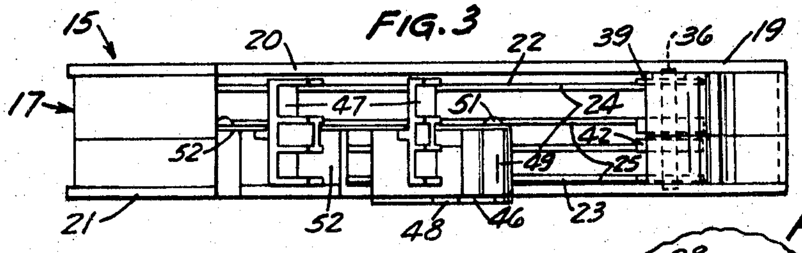
FIG. 3 is a front elevational view of the cartridge of FIG. 1.

Referring now to FIGS. 1 through 5, there is illustrated one embodiment of a tape cartridge made in accordance with the present invention, generally designated 15, adapted for supplying a tape to and positioned by guide means and spindles on the top deck of a recording apparatus, generally designated 16.

The cartridge 15 comprises a boxlike container 17 made from molded polymeric material and comprising an upper shell 19 and a lower shell 21 adapted to be secured together by suitable threaded fasteners. The shells 19 and 21 enclose a pair of similar reels 22 and 23 rotatably supported in an axially aligned position generally centrally of said container 17. Each reel (see FIG. 4) contains an upper circular flange 24 and an axially spaced lower circular flange 25 joined by a hub having a center bore. The upper shell 19 has a rectangular opening in the side and has one edge wall cutaway and the lower shell 21 has an irregularly shaped side and edge wall to provide an opening or cutaway portion 20 in one edge of the cartridge 15 to expose the tape in the tape path to be hereinafter described. The drive and support shaft for the reels 22 and 23 is rotatably mounted centrally of the container 17. The shaft is formed by a first sleeve 27 having a lower clutch disc 26 formed integrally therewith. One end of the sleeve 27 is fitted in an access opening 28 formed in the center of the sidewall of the lower shell 21. This end of sleeve 27 is provided with axially extending diametrically positioned tabs 33 (FIG. 5) affording means for a positive drive coupling with a reel driving spindle 84 on the apparatus 16. The opposite end of the sleeve 27 is supported within a cuplike projection 29 extending downward from the center of the sidewall of the upper shell 19. An upper clutch disc 30, formed integrally with a second sleeve 32, fits over sleeve 27, is concentric therewith, and is keyed or suitably connected to the lower clutch disc 26 and sleeve 27 by a projection 34 fitting in an opening 35 of the lower disc 26 to be rotated therewith. The sleeve 32 fits within the center bores of the reels 22 and 23 and the disc 30 is positioned between the two reels. Thus the reels 22 and 23 are resting on clutch discs 26 and 30 respectively and are rotatable relative to sleeve 32 and to each other. Adhesively secured on the outer surface of the lower flange 25 of each of the reels 22 and 23 and in opposed contacting relation to the clutch discs 26 and 30 are friction pads or discs 31 which are formed of a suitable material to cooperate with the material forming the clutch discs such that the torque transmitted to the reels is, or is substantially, directly proportional to the weight of the tape on said reels. Additionally, the slip clutches must afford a proper amount of tension in the tape to provide proper contact with the transducing head. Suitable material for the discs 31 and the clutch discs 26 and 30 are suede or felt and a polymeric material, e.g. acetal resin, respectively. Rotation of the sleeve 27 rotates the clutch discs 26 and 30 imparting driving torque to the reels 22 and 23 respectively, through the slip clutch discs 26, 30 and 31.

A length of tape 38 is wound on each of the reels 22 and 23 in the same direction, i.e. the tape, looking at FIG. 1, is wound clockwise around the inner hub of each reel toward the periphery. Means are provided to define a tape path from one reel along one edge of the container 17 across the cutaway portion 20 and back across said cutaway portion to the other reel. The tape path extends from the upper reel 22 around a first guide pulley 39, rotatably mounted on a support pin 36 positioned within the container 17 on one side of the cutaway portion and having an axis parallel to the axis of the reels 22 and 23, across the cutaway portion 20 of the container 17, between the upper tines of the tape guide and reel brake assembly 47, (FIG. 2) and to a second guide pulley 41. Pulley 41 is journaled about an axis normal to the axis of the pulley 39 on the opposite side of the cutaway portion. The tape 38 in traversing the guide pulley 41 is turned 180° and returns from the lower side of the pulley 41, between the lower tines of the tape guide assembly 47, and across the cutaway portion of the container 17 to a third guide pulley 42, positioned below the first guide pulley 29 and rotatably mounted on the same support pin 36, and onto the lower reel 23.

The lower shell 21 has a projection 46, formed in the side defining an arcuate opening 48 to receive a capstan 64 of the apparatus 16 as will be hereinafter described. The projection 46 also forms a partial edge wall and a boss 49 which receives a screw fastener 51 supporting one end of a cross plate 52 which is positioned above the tape guide and reel brake assembly 47.

The tape guide and reel brake assembly 47 includes a connecting plate 53 which is positioned between the reels 22 and 23 and extends from the opening 20 in the cartridge 15 toward one rear corner of the cartridge. The plate 53 is bifurcated at one end to define spaced tape guides each having an upper and lower set of tines supporting the tape in the path across the opening 20. The opposite end of the connecting plate 53 is formed with an opening 57 which is adapted to align with a keyhole-shaped opening in the side of the lower shell 21 which receives a movable cartridge positioning and locking pin (not shown) extending upward from the apparatus 16. The opposite end of the connecting plate 53 is also provided with an axially extending brake member 58 adapted for engaging the peripheral surfaces of the flanges of reels 22 and 23 and is held against the peripheral surfaces of said reels by means of a tension spring 56 joined at one end to the cross plate 52 and at the other end to an ear 59 formed on the side of the connecting plate 53. After the cartridge 15 is placed on the apparatus 16 the brake clamp is released by rearward movement of the "on" button 60 which, through appropriate linkages, moves the cartridge locking pin to draw the connecting plate 53 toward a corner of the container 17 against the bias of spring 56.

Referring to FIG. 1 there is illustrated the reproducing apparatus 16 with the outer cabinet or casing removed and with the conventional speaker or speakers removed and not shown. The cartridge 15 is properly positioned on a support deck 62 of the apparatus by means of cooperating guides and pins. With the cartridge 15 in position on the support deck 62 the tape 38 is in position for movement past a pickup and/or record means such as a magnetic head 63. The apparatus 16 is provided with means for driving the tape at a uniform speed and with means for reversing the direction of movement of the tape upon the transporting of a predetermined length of tape, or substantially all the tape, from one of said reels to the other of said reels. The bar to which the "on" button 60 is secured is spring biased toward the front of the apparatus 16 and the apparatus is placed in the "on" position by pushing the "on" button rearwardly and releasing it. Upon placing the apparatus in the "on" position the tape is moved past the magnetic head 63 and the conventional electrical circuitry is energized. As the apparatus is turned on the cartridge 15 is locked onto the support deck 62 and the brake member 58 in the cartridge 15 is released from the reel flanges by the cartridge locking pin. The "on" button 60 also affects the energization of the tape transport means to be hereinafter described and energizes the magnetic head 63 and speaker circuitry for reproducing the signals carried by the tape 38.

After the "on" button 60 has been pushed and as it is released, it actuates a switch (not shown) to energize a drive motor (not shown). A capstan flywheel (not shown) is rotatably mounted below support deck 62 and is driven, through appropriate idler wheels, from the drive motor. A capstan 64 extends centrally from the capstan flywheel vertically above the support deck 62 and is received within the arcuate cutaway portion 48 of the cartridge 15 and is positioned on one side of the tape 38. The capstan 64 provides for movement of the tape along the tape path and is driven continuously in one direction when the apparatus 16 is in the "on" mode.

The reels 22 and 23 are driven from a continuously driven spindle 66 which is rotated from the drive motor, through appropriate wheels, in the same direction as the capstan 64 or counterclockwise. The end of the spindle 66 projecting above the deck 62 is placed in driving contact with the sleeve 27 of the cartridge through access opening 28.

A tape guide pin 68 is movably supported from below the support deck 62 and projects upwardly through an arcuate slot 70 in the support deck 62. When the apparatus 16 is in the "off" mode, this pin 68 is supported at the end of slot 70 adjacent the reels 22 and 23. As the "on" button is pushed rearwardly, the guide pin 68 is moved, through appropriate linkages, along the slot 70 away from the reels 22 and 23 and it moves the tape from between the tines of the bifurcated tape guide 47 of the cartridge 15 to a position where the tape 38 will be placed at one point along its path in engagement with the face of the magnetic head (as shown in FIG. 1).

A pair of pressure rollers 75 and 76 are rotatably mounted adjacent and spring biased against the capstan 64. As will be more fully described hereinafter, a dual control cam 74 linked to the pressure rollers 75 and 76 allows only one pressure roller at a time to engage the capstan 64 under the force of its associated spring. When the apparatus is in the "off" mode a movable pressure roller retractor 67 retains both pressure rollers spaced from the capstan so that as the cartridge 15 is placed on the apparatus 16 the tape 38 may be placed between the capstan and the pressure rollers. As the "on" button 68 is pushed rearwardly the pressure roller retractor 67 is moved through appropriate linkages, to release the pressure rollers one of which is retained spaced from the capstan 64 by the dual cam 74 while the other presses the tape 38 against the capstan 64.

Thus, as the "on" button 60 is moved rearwardly the cartridge 15 is locked on the apparatus 16 and the reel brake 58 is released by the cartridge locking pin, the tape guide pin 68 moves the tape 38 into engagement with the magnetic head 63, and a pressure roller is released by the pressure roller retractor and presses the tape 38 against the capstan 64. As the "on" button is released and returns to its original position a switch is activated which energizes the magnetic head 63 and speaker circuitry for reproducing the signals carried on the tape 38 and which energizes the drive motor to rotate the reels 22 and 23 through drive spindle 66 and the capstan 64, whereby the tape 38 is transferred from one reel to the other and the signals carried thereon are reproduced.

As aforedescribed, this mechanism is provided with means for reversing the direction of travel of the tape along the tape path after a predetermined amount of tape has been withdrawn from a given reel. Upon such reversal it is necessary to reposition the head 63 such that it will be in position adjacent a different track on the tape in the new direction of tape travel. This reversing mechanism consists of a tape sensing arm 71 and power assisted reversing drive mechanism. The reverse sensing after a given length of tape is unwound from one reel is achieved by means of a piece of material or clip placed on the tape to increase its transverse thickness at a point substantially at each end of the tape, and this may be in the form of a trailer formed of thicker material and spliced to the end of the tape. The sensing arm 71 has, at one end (as seen in FIG. 1) two upstanding pins 72 spaced apart a distance less than the width of the clip and between which the tape 38 is drawn. During movement of the tape 38, the clip is moved around the guide roller 39 and 42 and is drawn against the pins 72 causing the end of arm 71 to be driven toward the capstan 64.

The dual-control cam 74 controls the placement of the pressure rollers 75 and 76 as aforementioned and also positions the magnetic head 63. As the end of tape sensing arm 71 seen in FIG. 1 is driven toward the capstan 64 by movement of the clip on the tape 38 the dual cam 74, through appropriate linkages, is rotated 45° to retract the pressure roller from the capstan 64 and to allow the other pressure roller to press the tape 38 against the capstan 64. As the dual cam 74 is being rotated, both pressure rollers 75 and 76 are spaced from the capstan 64 and the tape guide pin 68, through appropriate linkages from the sensing arm 71, is moved to its original position adjacent the reels 22 and 23. This permits the tape 38 to be withdrawn from the magnetic head 63 when the pressure rollers 75 and 76 are retracted and, upon further rotation of the dual cam 74, the magnetic head 63 is moved (as hereinafter described) while the pressure rollers and tape guide pin 68 remain retracted. After the dual cam 74 has been rotated 45° the previously unengaged pressure roller presses the tape 38 against the capstan 64 to reverse the direction of movement of the tape 38 thereby permitting the tape sensing arm 71 to return to its original position. Return of the tape sensing arm 71 causes the tape guide pin 68, through the connecting linkages, to move to its position spaced from the reels 22 and 23 thereby moving the tape 38 into contact with the magnetic head 63 while the dual cam 74 is restrained from rotation by an upwardly biased pin 78 engageable with detents in its base. Thus as the tape is transported to a position where the clip at either end of the tape 38 is drawn against the pins 72, further movement actuates the reversing mechanism to (almost immediately) retract one pressure roller, move the guide pin 68, shift the head 132, return the guide pin, and allow the other pressure roller to move toward the capstan 64 to drive the tape along the path in the opposite direction. The dual cam 74 provides, through suitable linkage, a predetermined number of positions for the magnetic head 63 (depending on the number of tracks on the tape) and two predetermined positions for each pressure roller 75 and 76. In the illustrated embodiment, the axially undulating cam surface 79 has eight circumferentially spaced surfaces providing four different positions for the magnetic head, opposing cam surfaces offering the same head position. The radially undulating cam surface 80 has eight surfaces providing two different positions for each of the pressure rollers, opposing surfaces likewise offering the same position for the pressure rollers.

The cam surface 79 cooperates with a cam follower assembly which affects the vertical shifting movement of the magnetic head 63. The magnetic head 63 is mounted on a plate 82 guided for translatory movement up and down on a pair of guide posts 83 and 84 (FIG. 1). The cam follower assembly includes a lever 86 having a bifurcated end portion 86 fitting about the post 83 and below the plate assembly 82. Intermediate the ends of the lever 86 is a cam follower 88. The other end of the lever 86 is pivotally mounted about a pin 90. The pin 90 is supported by an adjustable support frame 91 which is pivotally attached to a bracket 92 fixed to the support deck 62. The frame 91 supports the pin 90 and permits adjustment thereof and of the cam follower assembly by means of a screw 93, extending through the frame 91 and a compression spring (not shown), threadably received in a threaded opening of the bracket 92. The bracket 92 also supports a torsion spring 94 which has one end thereof bearing against the magnetic head support plate 82 to maintain the same in engagement with the bifurcated end portion 87 of the cam follower assembly lever 86.

The radially undulating cam surface 80 of dual cam 74 affords movement of the pressure rollers 75 and 76 as defined above. The upper pressure roller is mounted on a support arm 95 which is pivotally mounted on a pin 96 extending above the upper support deck 62. A projection 98 carrying a cam follower 99 extends from the arm 95. The follower 99 is engageable with the radial surface 80 of the dual cam for selectively positioning the upper pressure roller 75. A similar arm 100 supports the lower pressure roller 75. A similar arm 100 supports the lower pressure roller 76 on the pin 96 and has a cam follower 102. Tension springs 103 and 104 are connected between each of the pressure roller support arms 75 and 76 respectively and a support post 105. The springs 103 and 104 serve to bias the pressure rollers 75 and 76 toward the cam surface 80. The cam surface 80 allows only one pressure roller at a time to engage the capstan under the force of its associated spring. Therefore in a given position the dual cam 74 positions the magnetic head 63 in opposed relation to one of the tracks on the face of the tape along the lower portion of the tape path and places the lower pressure roller 76 in engagement with the tape and capstan. In another position the dual cam 74 places the head adjacent the tape in the upper portion of the tape path and the upper pressure roller 75 in engagement with the capstan. The pressure rollers 75 and 76 and the head 63 are positioned so the capstan 64 always pulls the tape across the head 63.

It will be noted that the novel construction of this apparatus eliminates the need of a pressure pad to press the magnetic tape into intimate contact with the face of the magnetic head or the need for other back-tensioning means along the path of the tape between the supply reel and the head. The construction of the two reels stacked one above the other and driven through similar clutches formed by the clutch discs and felt pads on the reels affords a uniform tension in the tape through out the tape path. This uniformity in tape tension in all positions of the tape relative to the two reels, i.e. wound substantially on one reel or the other or partially wound on one or the other, is accomplished because the amount of torque transmitted through the slip clutches is a function of the weight of the tape on a reel and tension in the tape is a function of torque divided by the moment arm, i.e. the distance between axis of rotation and the periphery of the wound tape. Due to the uniformity of this tension, any time that the operative pressure roller is retracted from the tape and capstan, tape movement and reel rotation stops instantly eliminating the need for reel brakes, except as provided for cartridge handling.

Referring now to FIGS. 6 through 10, there is illustrated a second embodiment of a tape cartridge made in accordance with the present invention and generally designated 110 adapted for supplying tape to a recording apparatus, generally designated 111. As in the first embodiment, the cartridge 110 comprises a boxlike container 112 having a cutaway portion 114 in one edge wall and within which a pair of reels 116 and 118 are axially aligned and independently rotatably mounted on a shaft 120 supported between opposed sidewalls of the container. Means are provided for guiding the tape from one reel across the cutaway portion 114 and back across the cutaway portion to the other reel and a tape guide and reel brake assembly is provided.

The container 112 is made from molded polymeric material and comprises an upper shell 124 and a lower shell 126 adapted to be secured together by suitable fasteners. The shells 124 and 126 enclose a pair of similar reels 116 and 118 rotatably supported in axially aligned position generally centrally of the container 112. Each reel (see FIG. 9) has an upper and a lower circular disc with a central opening axially spaced by a hub formed by mating cylindrical projections depending from the discs. The support shaft 120 for the reels 116 and 118 is stationarily supported centrally of the container 112 between the upper and lower shells 124 and 126. The reels 116 and 118 are spaced and supported on the shaft 120 by four bearings 128 and a washer 130. Each bearing 128 has a sleeve fitting on the shaft 120 and a flange formed around the exterior of the sleeve spaced from the ends thereof. Each bearing 128 is mounted on the shaft 120 with the major portion of its sleeve extending into the central opening of a reel disc and its flange resting on the face of the reel disc. The bearings supporting the adjacent faces of the reels 116 and 118 are further spaced by a flat washer 130 to assure independent rotation of the reels.

Figure 6:
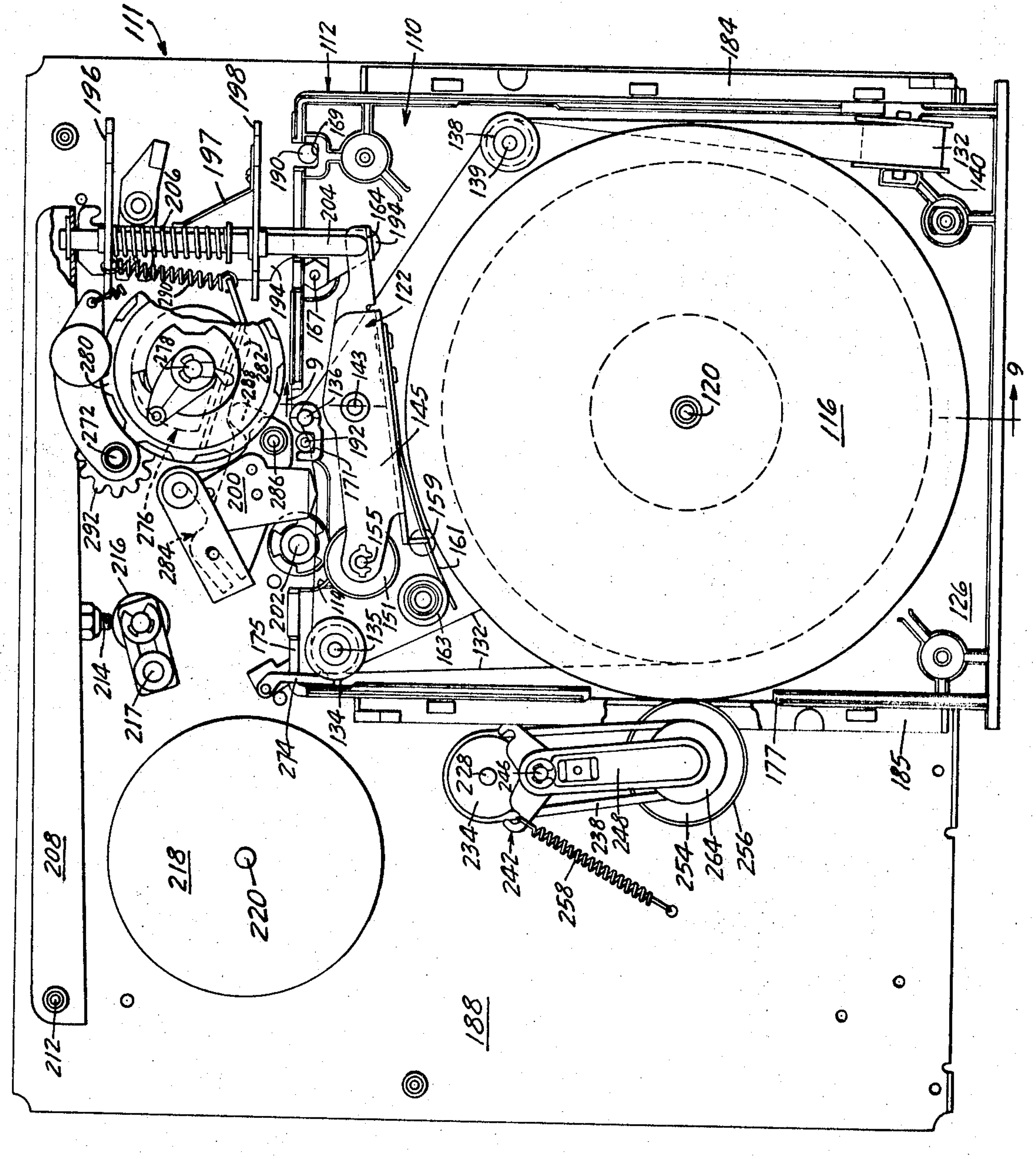
FIG. 6 is a plan view of a second embodiment of the cartridge with its upper shell removed shown in position on a recording an/or reproducing apparatus.

The upper and lower shells 124 and 126 are formed with similar rectangular side and edge wall openings forming the rectangular recessed opening or cutaway portion 114 in one edge of the cartridge 110 to expose the tape in the tape path to be hereinafter described. A length of tape 132 is wound on each of the reels 116 and 118 in the same direction, i.e. the tape, as viewed in FIG. 6, is wound clockwise around the inner hub of each reel toward the periphery. Means are provided to define a tape path from one reel along one edge of the container 112 across the cutaway portion 114 and back across the cutaway portion to the other reel. The tape path extends from the upper reel 116 around a first guide pulley 134 rotatably mounted on a support pin 135 positioned on one side of the cutaway portion 114, across the cutaway portion 114 of the container 112, around a stationary guide pin 136 positioned on the opposite side of the cutaway portion 114 from first pulley 134, around a second guide pulley 138 rotatably mounted on a support pin 139, and to a third guide pulley 140. Guide pulley support pins 135 and 139 and guide pin 136 are positioned with their axes parallel to the axis of the reels 116 and 118 while third guide pulley 140 is journaled about an axis normal to the axis of the reels. The tape 132 in traversing the third guide pulley 140, is turned 180° and returns from the lower side of the pulley 140, around a fourth guide pulley (not shown) rotatably mounted on pin 139 below second guide pulley 138, around the guide pin 136 spaced below the first pass across that pin; around a fifth guide pulley 142 rotatably mounted on support pin 135 below first guide pulley 134, and onto the lower reel 118.

This cartridge 110 is also provided with a tape guide and reel brake assembly which also supports the pressure rollers which cooperate with a capstan 202 to advance the tape 132. The tape guide and reel brake assembly is supported by a pin 143 mounted between the upper and lower shells 124 and 126 and positioned midway of the width of the container 112 between the tape guide pin 136 and the peripheries of reels 116 and 118 with its axis parallel to the axis of the reels. The tape guide and reel brake assembly comprises similar upper and lower reel brake and pressure roller subassemblies 122 and 123 which have channel-shaped bodies 145 and 147 rotatably mounted on support pin 143 generally midway of their lengths with their channel opening facing the edge of the container 112 having the cutaway portion 114. As viewed in FIG. 9, the height of the subassembly bodies 145 and 147 are generally equal to the thickness of reels 116 and 118 and serve to guide the tape between pin 136 and the second and fourth guide pulleys. A spacer 149 is placed on the support pin 143 between the upper and lower subassemblies 122 and 123 to align them with the peripheries of upper and lower reels 116 and 118, respectively. The subassembly bodies 145 and 147 each have one end extending across the cutaway portion 114, respectively supporting upper and lower pressure rollers 151 and 153 rotatably mounted on support pins 155 which extend between the flanges of the channel-shaped bodies 145 and 147. The closed wall of the channels adjacent the pressure rollers 151 and 153 are turned toward the reels 116 and 118 and support cylindrical friction brakes 159 which are aligned with one flange of their respective reels 116 or 118. The positions of the pressure roller support pins 155 and friction brakes 159 on the subassembly bodies 145 and 147 are adjusted such that when the friction brakes 159 contact the peripheries of the reels 116 and 118 the pressure rollers 151 and 153 are within the container 112 adjacent the cutaway portion 114. Leaf springs 161 are secured to the vertical walls of the subassembly bodies 145 and 147 and extend beyond the pressure rollers 151 and 153 and are loaded by a pin 163 extending between the upper and lower shells 124 and 126 to bias the friction brakes 159 into engagement with the peripheries of the reels 116 and 118 and the pressure rollers 151 and 153 away from the capstan.

At the end of the subassembly bodies 145 and 147 which extend away from the cutaway portion 114 of the container 112 a major portion of the upper flanges and closed walls of the channels are removed forming the tape path, except for vertical tabs 164 on the remote ends thereof. The container 112 is formed with an oblong opening 165 aligned with the vertical tabs 164 through which a pair of brake release and pressure roller activating rods 204 may extend to engage the tabs 164 as will be hereinafter described.

A cartridge locking post 167 is supported by the upper and lower cartridge shells 124 and 126 to the side of oblong opening 165 nearer the cutaway portion 114. Openings connecting pairs of opposed small rectangular recesses 169 and 171 are formed in the container 112 in the same edge as cutaway portion 114, one pair to each side of the locking pin 167 and generally equidistant therefrom. The recesses 171, nearer the cutaway portion 114, are between tape guide pin 136 and the cutaway portion 114. A narrow cartridge locking arm slot 173 is formed in the center of the edge wall and extends from the opening by the rectangular recess 169 to a point adjacent the cartridge locking post 167. The cartridge locking post 167, the pairs of opposed recesses 169 and 171, and the cartridge locking arm slot 173 are provided to cooperate with elements of the recording apparatus 111 in a manner hereinafter described to properly position the cartridge 110 during recording and/or reproduction. These cooperative elements of the cartridge 110 and the recording apparatus 111 are described and claimed in the copending application of Maynard P. Borman entitled Tape Cartridge Positioner, U.S. Ser. No. 843,695, filed on Jul. 22, 1969 and assigned to the assignee of the present invention. An opening 175 is also formed in the corner of the container 112 adjacent tape guide pulleys 134 and 142 for access to the pulleys by a pair of end of tape sensing arms 274. The cartridge 110 also has access opening 177 formed in an edge wall of the container 112 adjacent the edge wall in which the cutaway portion 114 is formed to expose the peripheries of the reel flanges of reels 116 and 118. This access opening 177 is formed by removal of a portion of an edge wall of the upper shell 124 and the removal of a portion of a sidewall and edge wall of the lower shell 126 to provide access to the reels 116 and 118 by a pair of reel driving discs 254 which frictionally engage the reel flanges. The function of the locking post 167, the rectangular recesses 169 and 171, the cartridge locking arm slot 173, the tape sensing arms 274, and the reel driving discs 254, will all be hereinafter described.

Figure 7:
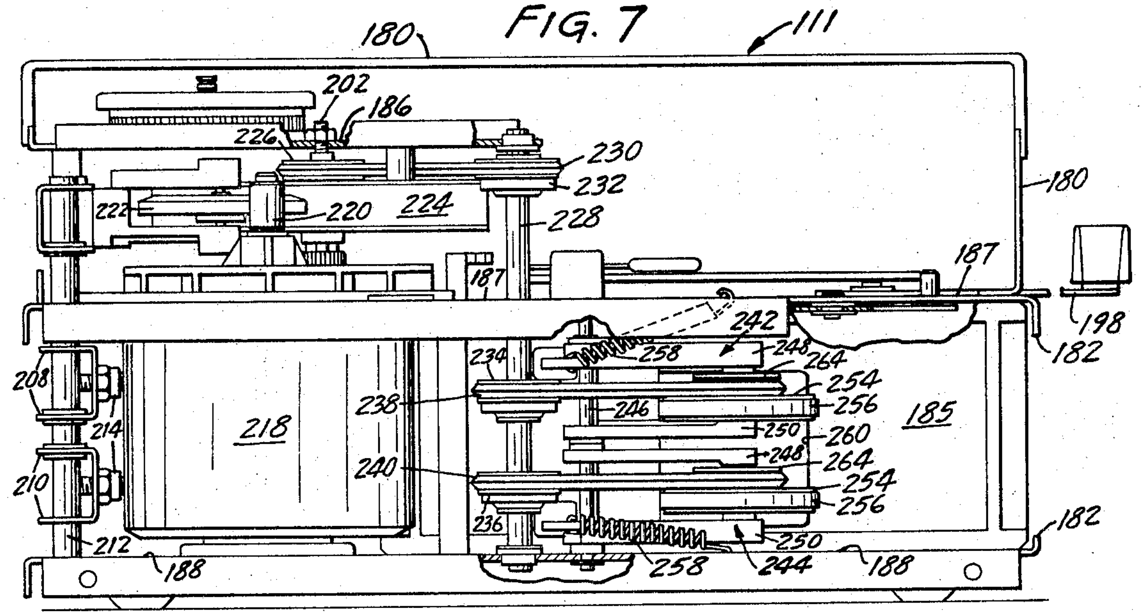
FIG. 7 is a longitudinal view of the apparatus with which the second embodiment of the cartridge may be used.
Figure 8:
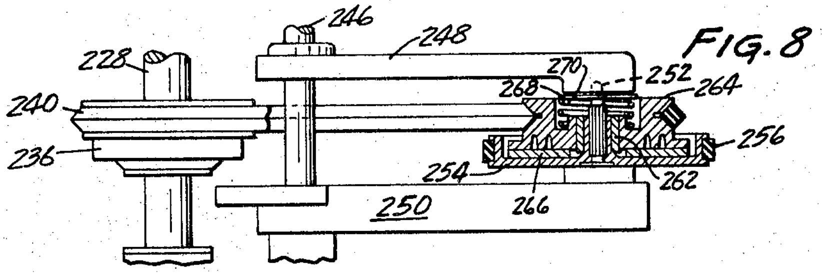
FIG. 8 is a partially cross sectioned view of a portion of the apparatus of FIG. 7.
Figure 9:
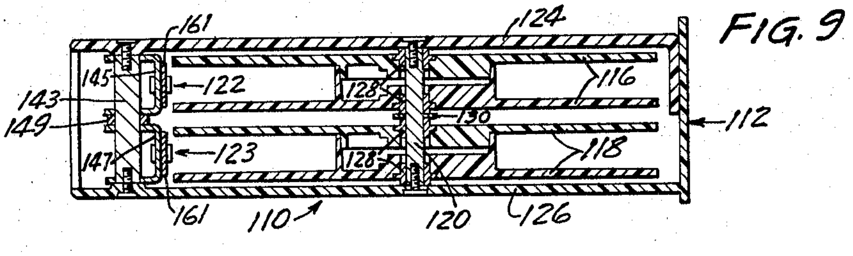
FIG. 9 is a longitudinal cross section view of the cartridge taken along line 9—9 of FIG. 6.
Figure 10:
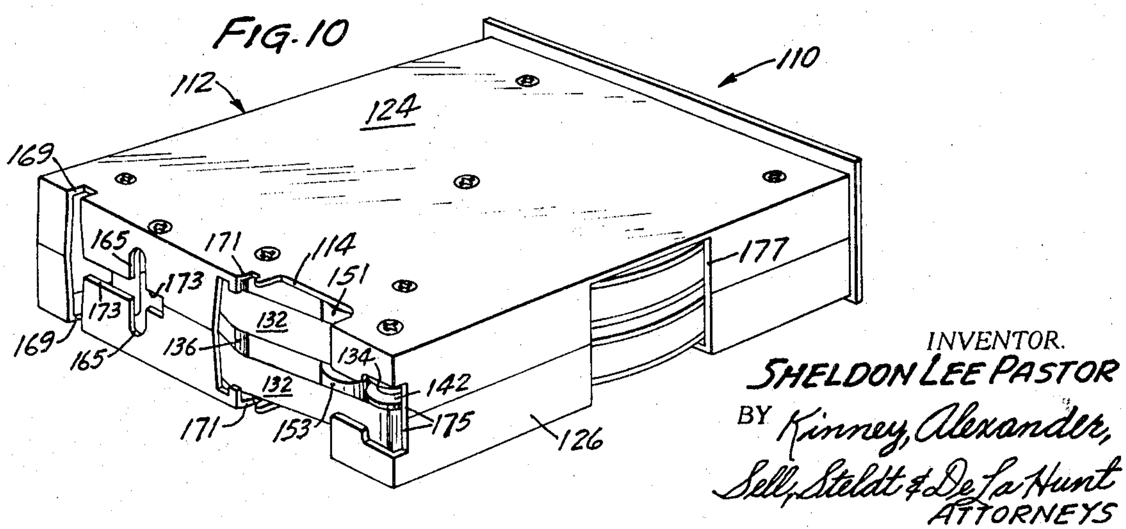
FIG. 10 is a perspective view of the second embodiment of the cartridge.

Referring to FIGS. 6, 7, and 8 there is illustrated the reproducing apparatus 111 for use with this embodiment of the cartridge. The recording apparatus cabinet 180 has a rectangular opening 182 between middle and lower support decks 187 and 188 having generally the same dimensions as the container edge wall in which the cutaway portion 114 is formed. Within the cabinet two vertical walls 184 and 185, one on either side of opening 182, guide the cartridge as it is pushed through opening 182 along a lower support deck 188 until the cartridge is positioned as shown in FIG. 6.

Two cartridge positioning pins 190 and 192 are supported between the middle and lower support decks 187 and 188 and positioned to fit within the small rectangular recesses 169 and 171 in the cartridge edge wall. The positioning pin 192 that fits within recess 171 is formed with smaller diameter portions in the two areas in which the tape path crosses it to further guide the tape 132. A cartridge locking arm 194 is movably supported generally midway of the height of a pair of brackets 196 and 198 extending between support decks 187 and 188 to pass through the narrow locking arm slot 173 in the container edge wall. This arm 194 has a curved end extending into the cartridge and is formed with a hook along one edge which engages cartridge locking post 167. It is biased by a leaf spring 197 toward locking post 167 so that as the cartridge 110 is inserted into the apparatus the locking post 167 first contacts the curved end of the locking arm 194. Further movement of the cartridge then moves the locking arm 194 against the bias of leaf spring 196 until the locking post 167 passes the hook which is then forced into engagement with the post 167 by the leaf spring 197. A cartridge locking lever 198 is supported at the front of the apparatus 111 and is connected by appropriate linkages to the locking arm 194 such that movement of the lever 198 draws the hook in locking arm 194 securely against locking post 167 and moves the arm 194 rearwardly pulling the rectangular recesses 169 and 171 in the container edge wall snugly against cartridge positioning pins 190 and 192 to positively position the cartridge 110 in the apparatus 111.

A pair of brake release and pressure roller activating rods 204 are slidably supported by brackets 196 and 198, one above and one below cartridge locking arm 194. These rods 204 are positioned to extend through the oblong opening 165 in the container edge wall such that each rod contacts one of the vertical tabs 164 at the ends of the brake release and pressure roller subassemblies 122 and 123 when the cartridge 110 is locked in the apparatus 111. Each rod is biased by a spring 206 toward the cartridge 110 to rotate the brake subassemblies 122 and 123 about their support pin 143 and thereby to release the brakes 159 from the reels and press the pressure rollers 151 and 153 against the capstan 202. The ends of the brake release rods 204 which extend away from the cartridge 110 are restrained, each at one end of one of a pair of long channel-shaped arms 208 and 210. These arms 208 and 210 are rotatably mounted one above the other at their opposite ends on a shaft 212. With the cartridge locked in position and the apparatus 111 in the "off" position, projections 214, one extending from each of the arms 208 and 210 generally midway of their lengths, rest against one end of a vertical brake release rod locator 216 which is rotatably mounted on a shaft 217 and which positions the arms 208 and 210 with the brake release rods 204 held against the force of springs 206 so that they contact the vertical tabs 164 without releasing the reel brakes 159 (as illustrated in FIG. 6).

With the cartridge 110 in position locked in the apparatus 111 the tape 132 is in position for movement past a pickup and/or record means such as a magnetic head 200 by a uniform speed driving means such as capstan 202. The apparatus is provided with means for maintaining the proper tension in the tape as it is driven and means for reversing the direction of movement of the tape upon the transporting of a predetermined length of tape, or substantially all the tape, from one of said reels to the other of said reels. The apparatus 111 is placed in the "on" position by activation of a switch (not shown) on the front of the apparatus. Upon placing the apparatus in the "on" position the reel brakes 159 are released and one pressure roller presses the tape 132 against the capstan 202. The "on" switch also effects the energization of the capstan 202 to move the tape past the magnetic head 200 and energizes the magnetic head and speaker circuitry for reproducing the signals carried by the tape 132.

Activation of the "on" switch energizes a drive motor 218 having a vertical drive shaft 220 extending above the middle support deck 187. Through its drive shaft 220 and an idler wheel 222 the motor 218 drives a capstan flywheel 224 which is supported at its center between the upper and middle support decks 186 and 187 on the capstan 202 and which drives the capstan at a uniform speed. The capstan 202 is bearinged at its ends in the upper and lower support decks 186 and 188 and is positioned to be received in the cutaway portion 114 of the container 112 on one side of the tape path opposite the pressure rollers 151 and 153. The capstan 202 provides for movement of the tape 132 along the tape path and is driven continuously in one direction when the apparatus 111 is in the "on" mode.

A first pulley 226 is secured to the capstan 202 above the capstan flywheel 224 and drives a reel driving spindle 228 in the same direction as capstan 202 through a first belt 230 which passes around a second pulley 232 secured to the reel driving spindle 228 adjacent the upper support deck 186. The reel driving spindle 228 is bearinged at its ends in the upper and lower support decks 186 and 188 and has a third and a fourth pulley 234 and 236 secured to it between the middle and lower support decks 187 and 188. Through third and fourth pulleys 234 and 236, a second and a third belt 238 and 240, and a pair of similar and independent slip-clutched reel driving assemblies 242 and 244, the reel driving spindle 228 drives the tape reels 116 and 118 in the same direction about the reel support shaft 120 to keep the tape 132 under tension as it is moved by capstan 202.

The reel driving assemblies 242 and 244 are independently rotatably supported one above the other on a vertical shaft 246 positioned within the loops of second and third belts 238 and 240. Each assembly (as seen in FIG. 8) has an upper arm 248 and a lower arm 250 supported at one end on the shaft 246 and spaced from each other by a support pin 252 rotatably mounted between the unsupported ends of the arms 248 and 250. In each assembly 242 and 244 a reel driving disc 254 having a circular base, a central hollow cylindrical hub and a peripheral rim is secured to the support pin 252 with its base adjacent the lower arm 250. The support arms 248 and 250 position the peripheral rims of the upper and lower assembly reel driving discs 254 in alignment respectively with the opening 177 in the cartridge edge wall. A frictional material 256, such as rubber, is secured around the peripheral rims of the discs 254 to aid in driving the reels 116 and 118. Each reel driving assembly 242 and 244 is biased about the shaft 246, through an opening 260 in the cartridge guide wall 185, into engagement with the periphery of a reel flange of its aligned tape reel 116 or 118 by a spring 258. A radial bearing 262 surrounds the cylindrical hub of each reel driving disc 254 and supports a pulley 264. The pulley 264 in the upper assembly 242 is vertically aligned with and driven by third pulley 234 through second belt 238 while the similar pulley 264 in the lower assembly 244 is vertically aligned with and driven by fourth pulley 236 through third belt 240. Each pulley 264 has one end formed with a flange which lies within the rim of a wheel 254 adjacent the base of the wheel. A friction pad or disc 266 is secured to the surface of each pulley 264 facing the base of a wheel 254 and a helical spring 268 loaded between the pulley 264 and a washer 270 adjacent each upper arm 248 forces the friction pad into engagement with the base of the disc 254 to form a slip clutch. The friction pads or discs 266 are formed of a suitable material to cooperate with the material forming the bases of the discs 254 such that the torques transmitted to the reels 116 and 118 are, or are substantially, equal and afford a proper amount of tension in the tape to provide proper contact with the magnetic head 200. Suitable materials for the friction pads 266 and the driving wheels 254 are suede or felt and a polymeric material, e.g. acetal resin, respectively. The slip clutches apply an overdriving winding torque to the flange of one reel and simultaneously apply a braking force to the flange of the other, or supply reel during operation.

As the drive motor 218 is energized, the brake release rod locator 216, through appropriate linkages from the motor drive shaft 220, is also rotated about its support shaft 217 to allow the brake release rods 204 to be moved by springs 206 against the vertical tabs 164 of the brake subassemblies 122 and 123. Movement of the release rods 204 rotates the channel-shaped arms 207 and 210 about their support shaft 212 until each arm rests against one of a pair of similar cams (not shown) secured to a camshaft 272. These cams are 90° out of phase such that one arm is supported to permit its associated release rod 204 to rotate the associated brake subassembly an extent sufficient to disengage the friction brake 159 from the periphery of a reel and to move a pressure roller to press the tape 132 against the capstan 202, while the other arm is supported to permit its associated release rod 204 to rotate the associated brake subassembly an extent just sufficient to disengage the friction brake 159.

As aforedescribed, this mechanism is provided with means for reversing the direction of travel of the tape 132 along the tape path after a predetermined amount of tape has been withdrawn from either reel. Upon such reversal, it is necessary to reposition the head 200 such that it will be in a position adjacent a different track on the tape in the new direction of tape travel. The tape reversing mechanism hereinafter described is the subject of my copending application entitled End of Web Sensing, U.S. Ser. No. 870,355, filed on Sept. 30, 1969 and assigned to the assignee of the present invention. This reversing mechanism consists of a pair of reverse arms 274 which extend through the corner opening 175 in the cartridge 110 and actuate a power assisted reversing drive mechanism. The reverse sensing after a given length of tape is unwound from either reel is achieved by means of slits in the tape running along its length midway of its width or similar slits in trailers spliced to the ends of the tape. The sensing arms 274 are spring biased against the tape midway of its width, each arm being formed with an ear having a thickness generally equal to the width of the slit in the tape which contacts the tape adjacent one of the corner tape guide pulleys 134 or 142. During movement of the tape 132 a slit portion of the tape or one of the trailers passes around one of the corner tape guide pulleys 134 or 142 and the ear of the associated tape sensing arm 274 engages the slit to drive the tape sensing arm 274 toward the capstan 202. The corner tape guide pulleys 134 and 142 may be formed with lesser diameters centrally of the tape path thereabout to allow the ears of the tape sensing arms 274 to protrude through the tape at the slits to firmly drive the arms 274.

As a tape sensing arm 274 is driven toward the capstan 202, it rotates, through appropriate linkages, a dual-control cam assembly 276 (clockwise as viewed in FIG. 6) which controls the position of the magnetic head 200 and the brake release rod cams. This cam assembly 276 is supported on a rotatable shaft 278 and comprises an assembly locating disc 280 secured to the shaft, a spur gear (not shown) secured to the shaft below the locating disc 280, an axially undulating cam (not shown) which vertically positions the head 200, and a radially cammed arm 282 which horizontally positions the head 200.

The magnetic head 200 is supported on a linkage assembly 284 which is rotatably mounted on a shaft 286 and which has a positioning lobe 288. The linkage assembly 284 is spring loaded to bias the end of the positioning lobe 288 into contact with the radially cammed arm 282 and one face of the lobe 288 into contact with the axial cam of the dual cam assembly 276. The linkage assembly 284 normally supports the head 200 in the cutaway portion 114 of the cartridge 110 adjacent the capstan 202 and in contact with the tape 132. As the dual cam assembly 276 begins to rotate its radial cammed arm 282 is rotated against the lobe 288 of the head linkage 284 to rotate the linkage 284 about the shaft 286 and thereby to move the head 200 away from the tape 132. Upon further rotation of the dual cam assembly 276, a different portion of the axial cam is rotated into position adjacent the face of the lobe 288 and the linkage assembly 284 is simultaneously moved vertically on its support shaft 286 to contact the face of the lobe 288 against this portion of the axial cam. This vertical movement of the linkage assembly 284 is assisted by spring means and the cam assembly 276 positions the magnetic head 200 adjacent a new track on the tape 132 in the opposite direction of tape travel. As the dual cam assembly 276 completes its rotation the radially cammed arm 282, under the force of a spring 290, rotates back to its original position thereby permitting the head 200 to return to a position where it again contacts the tape 132.

The spur gear of the dual cam assembly 276 engages a spur gear 292 secured to the brake release rod camshaft 272 above the aforedescribed brake release cams (not shown). As the dual cam assembly 276 rotates to reposition the head 200 it causes the brake release spur gear 292 to rotate 90° thereby rotating the brake release cams through 90°. As aforementioned the brake release cams are 90° out of phase. Thus, as the brake release cams rotate, the support arm 208 or 210 associated with the pressure roller in contact with the capstan 202, is rotated about its support shaft 212 to withdraw its release rod 204 from the cartridge 110 an amount sufficient to disengage the pressure roller from the capstan 202 without engaging the associated friction brake 159 against a reel. At the same time the other support arm is permitted to rotate about is support shaft 212 under the force of a brake release rod spring 206 thereby permitting its associated brake release rod 204 to move further into the cartridge 110 an amount sufficient to press the previously unengaged pressure roller against the capstan 202. The tape 132 is then driven in the opposite direction in the tape path permitting the tape release arm 274 engaged by the slit in the tape to return to its original position.

Thus, as a tape sensing arm 274 is engaged by a slit in the tape 132 it is driven by the tape toward the capstan 202. Through appropriate linkages the dual-control cam assembly 276 is rotated by movement of the tape sensing arm 274 to retract one pressure roller, move the head away from the tape, shift the head, move the head back into contact with the tape, and allow the other pressure roller to move toward the capstan 202 to drive the tape along the path in the opposite direction.

I claim:

1. A cartridge for supplying a length of tape to a recording and/or reproducing machine having means for driving a pair of axially aligned reels in the same direction about their axis including a single reel driving spindle adapted to drive each reel of a said pair of axially aligned reels through an independent slip clutch, said cartridge comprising:

a container formed of shell means defining a boxlike enclosure with a cutaway portion along one edge and an aperture in one wall for access to the interior thereof by said reel driving means;

a shaft supported generally centrally of said enclosure by said shell means;

flanges, rotatably mounted on said shaft for rotation relative to said shaft and to each other;

tape guide means defining a tape path from one of said reels along said one edge, across said cutaway portion of said container and back across said cutaway portion in spaced parallel relationship, to the other of said reels, said guide means including one guide roller rotatably mounted on an axis normal to the axis of said shaft; and a length of tape, said tape extending between said reels along said tape path and being convolutely wound on said reels in the same direction about their axes.

2. A cartridge according to claim 1 including a friction reel brake assembly supported by said shell means for braking said reels when not in operation.

3. A cartridge according to claim 1 wherein both portions of said tape path defined by said tape guide means across said cutaway portion lie in the same plane.

4. A cartridge for supplying a length of tape to a reproducing machine having a single vertically positioned reel driving spindle comprising:

a container formed of shell means defining a boxlike enclosure with a cutaway portion along one edge;

a shaft rotatably mounted generally centrally of said enclosure on said shell means, said shaft having means on one end to afford a drive coupling with said reel driving spindle and at least a pair of clutch discs affixed thereto in axially spaced relation;

a pair of reels, each having axially spaced parallel flanges, rotatably mounted on said shaft, said reels being positioned on opposite sides of one of said pair of clutch discs and each of said reels being supported by a different one of said discs with a flange of each of said reels frictionally engaging an associated disc when said one end of said shaft is connected to a said spindle; and tape guide means defining a tape path from one of said reels along said one edge across said cutaway portion of said container and back across said cutaway portion to the other of said reels.

5. A cartridge for supplying a length of tape to a reproducing machine having a single vertically positioned reel driving spindle comprising:

a container formed of shell means defining a boxlike enclosure having a cutaway portion along one edge;

a shaft rotatably mounted generally centrally within said enclosure on said shell means, said shaft having means on one end to afford a drive coupling with a said reel driving spindle and at least a pair of clutch discs affixed thereto in axially spaced relation;

a pair of reels, having axially spaced parallel flanges, rotatably mounted on said shaft for rotation relative to said shaft and to each other, said reels being positioned on opposite sides of one of said pair of discs and each of said reels being supported by a different one of said discs when in an operating position with a flange of each said reel engaging a different one of said discs, each reel having said flange provided with a friction covering to engage the cooperating clutch disc;

tape guide rollers positioned adjacent opposite corners of said cutaway edge to define a tape path from one reel along said edge across the cutaway portion and back across said cutaway portion to the other reel; and a bifurcated tape guide and friction reel brake assembly supported by said shell means and positioned between the reels for braking the reels when not in operation and for supporting the tape across the cutaway portion.

6. A cartridge for supplying a length of tape to a reproducing machine having a single reel driving spindle comprising:

a container formed of first and second shell means joined together by a suitable fastening means to define a boxlike enclosure having a cutaway portion along one edge;

a shaft rotatably mounted generally centrally of said enclosure on said shell means, said shaft having means on one end to afford a drive coupling with a said reel driving spindle and a pair of clutch discs affixed thereto in axially spaced relation;

a pair of reels, having axially spaced parallel flanges, rotatably mounted on said shaft for rotation relative to said shaft and to each other, said reels being positioned on opposite sides of one of said pair of discs and each of said reels being supported by a different one of said discs when said container is positioned with said one end of said shaft below the other end thereof, and each reel having a felt ring affixed to a flange thereof and positioned in opposed cooperating position with the clutch disc supporting the reel;

a length of tape wound on said reels, said tape having one end attached to one of said reels and the other end attached to the other of said reels; and tape guide means defining a tape path from one of said reels along said one edge of said container across said cutaway portion and back across said cutaway portion to the other of said reels, said guide means including a pair of rollers positioned in axially aligned position and rotatably on a pin, the axis of which is parallel to said shaft, mounted in said container adjacent one side of said cutaway portion and a roller mounted for rotation on an axis normal to said shaft and positioned in said container on the side of said cutaway portion opposite said pair of rollers.

7. A cartridge for supplying a length of tape to a reproducing machine having a single vertically positioned reel driving spindle, a cartridge receiving area, and slip-clutched reel driving means driven by said driving spindle for independently frictionally driving a pair of axially stacked reels in said cartridge receiving area in the same direction about their axes, said cartridge comprising:

a container formed of shell means defining a boxlike enclosure with a cutaway portion along one edge and an aperture in a second edge for receiving said reel driving means;

a shaft supported generally centrally of said enclosure by said shell means;

a pair of reels, each having axially spaced parallel flanges, rotatably mounted on said shaft for rotation relative to said shaft and to each other;

tape guide means supported by said container defining a tape path from one of said reels along said one edge across said cutaway portion of said container and back across said cutaway portion to the other of said reels, said guide means including one guide roller rotatably mounted on an axis normal to the axis of said shaft; and a length of tape, said tape extending between said reels along said tape path and being convolutely wound on said reels in the same direction about their axes.

8. A cartridge for supplying a length of tape to a recording-reproducing machine having a single vertically positioned reel drive spindle, a cartridge receiving area spaced from said drive spindle, slip-clutched reel driving means driven by said drive spindle for independently rotating a pari of axially stacked reels in said cartridge receiving area in the same direction about their axes, an adjustably positioned transducer and a capstan positioned adjacent said cartridge receiving area, and cartridge locating means movable in response to operation of said reproducing machine comprising:

a container formed of shell means defining a boxlike enclosure with a cutaway portion along open edge to be aligned with said capstan when said container is in said cartridge receiving area and an aperture in the wall of a second edge providing access to the interior of said container by said slip-clutched reel driving means;

a shaft supported generally centrally of said enclosure by said shell means;

a pair of reels, each having axially spaced parallel flanges, rotatably mounted on said shaft for rotation relative to said shaft and to each other;

tape guide means defining a tape path from one of said reels along said one edge across said capstan aligned cutaway portion of said container and back across said capstan aligned cutaway portion to the other of said reels, said guide means including one guide roller rotatably mounted on an axis normal to the axis of said shaft;

a length of tape, said tape extending between said reels along said tape path and being convolutely wound on said reels in the same direction about their axes; and a friction reel brake and pressure roller assembly supported by said shell means, said assembly positioning a pressure roller adjacent said cutaway portion of said container across said tape path and a friction reel brake in engagement with said reels when not in operation and engaged by said cartridge locating means to position said pressure roller in said cutaway portion of said container to press said tape against said capstan drive and to move said friction reel brake away from said reels when in operation.

UNITED STATES PATENT OFFICE

CERTIFICATE OF CORRECTION

Patent No. 3,570,780 Dated March 16, 1971

Inventor(s) Sheldon Lee Pastor

Figure 5:
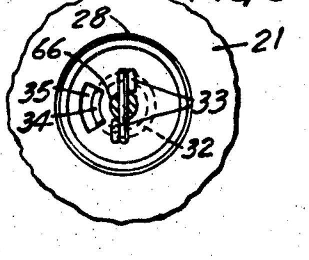
FIG. 5 is fragmentary bottom view of the central portion of the cartridge shown in FIG. 1 with the apparatus reel drive spindle shown in section.
Figure 4:
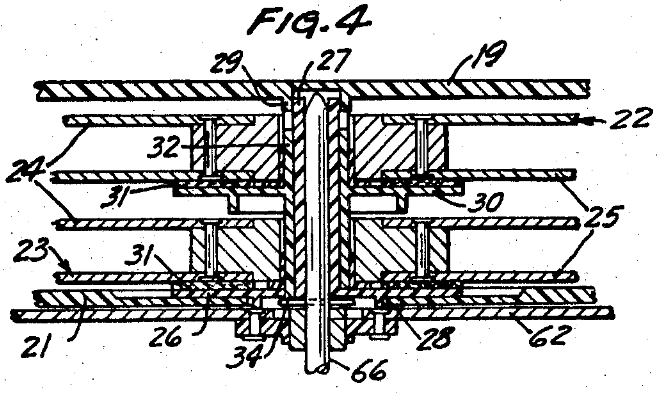
FIG. 4 is a fragmentary sectional view of the cartridge of FIG. 1 taken along the line 4—4.

It is certified that error appears in the above-identified patent and that said Letters Patent are hereby corrected as shown below:

Column 1, line 68, after "FIG. 5 is" insert -- a --;

line 73, change "an/or" to -- and/or

Column 3, line 6, change "29" to -- 39 --;

Column 5, line 42, change "86" (second occurre to -- 87 --; and line 66, change "75" to -- 76 --.

In the Claims

In claim 1, line 18 before "flanges" insert -- pair of reels, each having axially spaced parallel --;

In claim 8, line 18, change "pari" to -- pair and line 25, change "open" to -- one -

Signed and sealed this 24th day of August 1971.

(SEAL)
Attest:

EDWARD M.FLETCHER,JR.
Attesting Officer

WILLIAM E. SCHUYLER, J
Commissioner of Patent